(12) United States Patent
Wasko

(10) Patent No.: US 6,850,765 B2
(45) Date of Patent: Feb. 1, 2005

(54) TRANSMITTER USING FREQUENCY HOPPING FOR MOBILE COMMUNICATIONS SYSTEMS

(75) Inventor: Stephen Wladyslaw Wasko, Lostwithiel (GB)

(73) Assignee: Nokia Corporation, Espoo (FI)

( * ) Notice: Subject to any disclaimer, the term of this patent is extended or adjusted under 35 U.S.C. 154(b) by 215 days.

(21) Appl. No.: 09/874,823

(22) Filed: Jun. 5, 2001

(65) Prior Publication Data

US 2002/0019217 A1 Feb. 14, 2002

Related U.S. Application Data

(63) Continuation of application No. PCT/EP99/09177, filed on Nov. 24, 1999.

(30) Foreign Application Priority Data

Dec. 8, 1998 (GB) .............................................. 9827015

(51) Int. Cl.[7] ................................................. H04B 1/04
(52) U.S. Cl. ......................... 455/450; 455/103; 455/118
(58) Field of Search ................................. 455/561, 450, 455/103, 104, 115.1, 118, 120, 91; 370/321, 336, 337, 347, 330, 436; 375/132

(56) References Cited

U.S. PATENT DOCUMENTS

| 5,438,683 | A | * | 8/1995 | Durtler et al. ................ 455/74 |
|---|---|---|---|---|
| 5,452,290 | A | | 9/1995 | Mihm, Jr. |
| 5,719,857 | A | * | 2/1998 | Heikkinen .................. 370/330 |
| 5,781,582 | A | | 7/1998 | Sage et al. |
| 5,822,362 | A | | 10/1998 | Friedmann |
| 5,867,535 | A | * | 2/1999 | Phillips et al. ............... 375/295 |
| 5,898,733 | A | * | 4/1999 | Satyanarayana ............ 375/133 |
| 6,054,894 | A | * | 4/2000 | Wright et al. ............... 330/149 |
| 6,054,896 | A | * | 4/2000 | Wright et al. ............... 330/149 |
| 6,064,694 | A | * | 5/2000 | Clark et al. ................. 375/224 |

FOREIGN PATENT DOCUMENTS

WO    WO 95/26040    9/1995

OTHER PUBLICATIONS

International Search Report of PCT/EP99/09177.

* cited by examiner

Primary Examiner—Erika A. Gary
(74) Attorney, Agent, or Firm—Squire, Sanders & Dempsey L.L.P.

(57) ABSTRACT

A transmitter for transmitting RF data in an RF communication network using a plurality of carrier frequencies is described. The transmitter has a data splitter for receiving an information signal at an intermediate frequency lower than the carrier frequency, and two transmitter paths each having an input connected to the data splitter and each having a frequency modulator for upconverting the intermediate frequency to a respective carrier frequency, the carrier frequency being individually selectable for each transmitter path.

8 Claims, 6 Drawing Sheets

PRESENT INVENTION

TRANSMITTER USING FREQUENCY HOPPING FOR MOBILE COMMUNICATIONS SYSTEMS

This application is a continuation of international application serial number PCT/EP99/09177, filed Nov. 24, 1999.

BACKGROUND OF THE INVENTION

1. Field of the Invention

The present invention relates to an architecture, for a transmitter in a mobile communications system and particularly, but not exclusively, to an architecture for a base-station transmitter which supports frequency-hopping in a TDMA environment.

2. Description of the Related Art

At present in Europe a GSM standard operates for transmission of information in the mobile communication network. According to that standard, information is transmitted in a sequence of time slots, each time slot having the possibility of being allocated a different carrier frequency for modulating the information to be transmitted. The GSM standard requires that transmitters in base station transceivers can switch their frequency (frequency-hop) between consecutive time slots. This has been achieved according to a known transmitter architecture by providing a so-called "ping-pong" synthesizer which generates different frequencies on a time slot basis. While this technique works, it requires high isolation between the synthesizers which is difficult to achieve.

BRIEF SUMMARY OF THE INVENTION

According to the present invention there is provided a transmitter for transmitting RF data in an RF communication network using a plurality of carrier frequencies, the transmitter comprising:

a data splitter for receiving an information signal at an intermediate frequency lower than the carrier frequency; and two transmitter paths each having an input connected to the data splitter and each having a frequency modulator for upconverting the intermediate frequency to a respective carrier frequency, the carrier frequency being individually selectable for each transmitter path.

BRIEF DESCRIPTION OF THE DRAWINGS

For a better understanding of the present invention and to show how the same may be carried into effect the invention will now he described, by way of example only, with reference to the accompanying drawings in which.

DETAILED DESCRIPTION OF THE INVENTION

Figure 1:
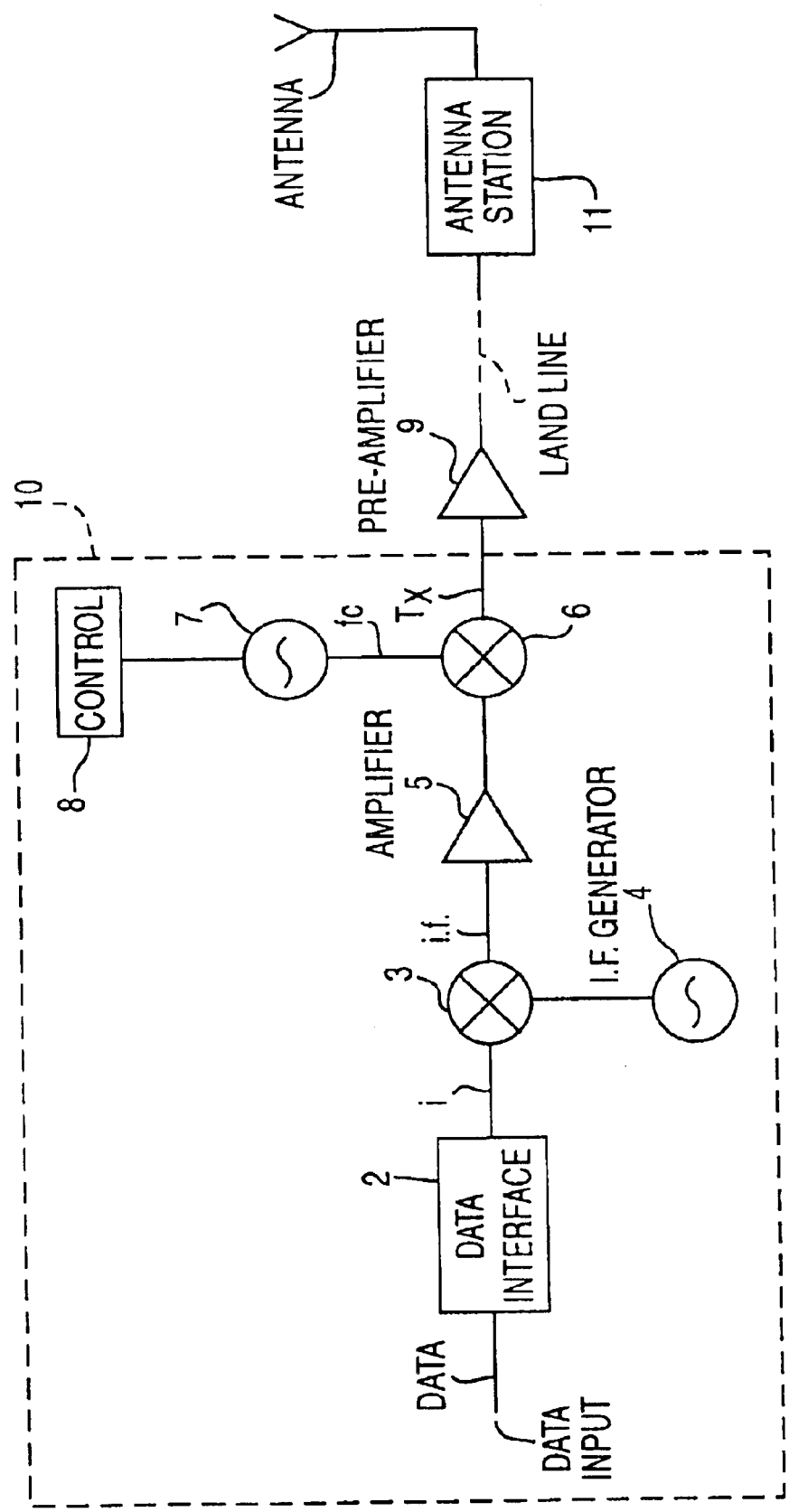
FIG. 1 is a block diagram showing the principle components of a known transmitter system used in a base-station.

FIG. 1 is a block diagram of a transmission system 10 for an RF communications system such as that for a mobile telephone network. Such a transmission system may be utilised, for example, at a base-station for the communications network or within mobile stations communicating with the base-station.

A data input signal DATA, which may be in analog format, is supplied to the system from a data generator (not shown). The input signal may contain voice information or any other such information which is required to be transmitted. The input signal is fed into a data interface 2 which performs the necessary encoding etc. to generate an information signal 1 for transmission. The precise details depend on the nature of the communications system.

The information signal 1 is supplied to a mixer 3 to which there is also supplied an intermediate frequency signal generated by an I.F. generator 4. The mixer 3 mixes the two signals such that the output therefrom is an intermediate frequency signal i.f modulated by the information signal. In essence, therefore, the information signal is up-converted from the base-band to an intermediate frequency.

The up converted information signal i.f. is then amplified by an amplifier 5 and is supplied to a second mixer 6.

A local oscillator 7 generates a radio frequency carrier signal $f_c$ which is fed into the second mixer 6. The carrier frequency fc is selectable by a controller 8 within a transmission band which may lie, for example, between 935.2 MHz and 9598 MHz. The information signal i.f and the carrier signal $f_c$ are mixed and output as a transmission signal TX. The transmission signal thus comprises the carrier signal $f_c$ modulated by the information signal i.f. Again, in essence the information signal is further up-converted to radio frequencies to facilitate transmission.

A pre-amplifiers 9 amplifies the transmission signal to a level to enable the signal to be transmitted via land line to an antenna station 11, which may be situated remote from the base station 10, without the signal being attenuated to such an extent that it becomes unusable. Such an antenna station may comprise an antenna and a power amplifier which amplifies the transmission signal to levels which allow the signal to be transmitted as electromagnetic radiation over large distances.

Once amplified by the power amplifier, the transmission signal is fed to the antenna as an output signal from where it is radiated out as electromagnetic radiation.

Figure 2:
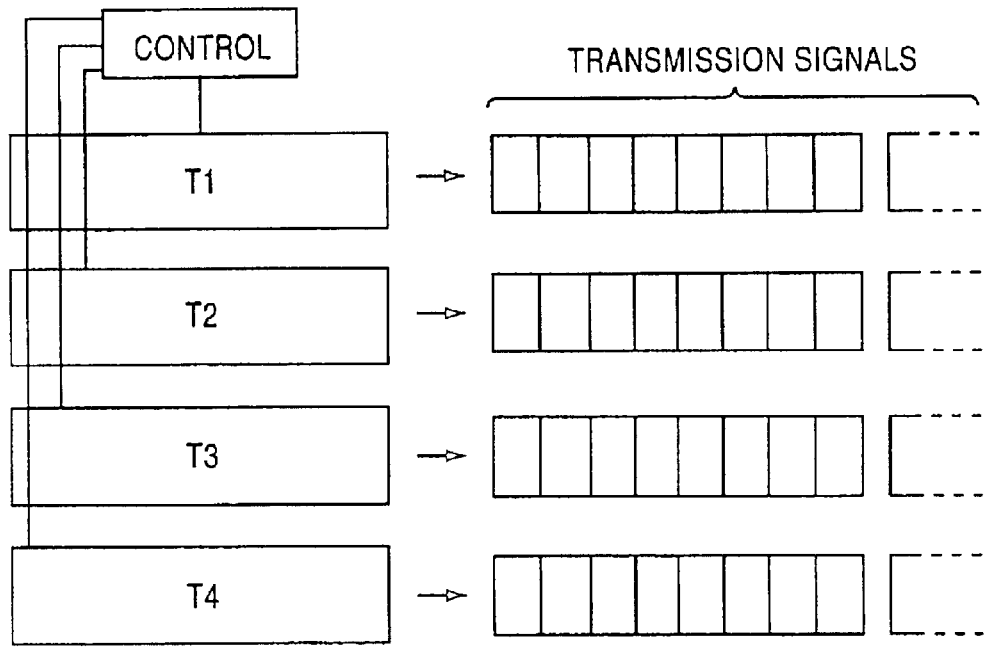
FIG. 2 is a block diagram showing a number of separate transmitter paths in the transmitter.

Usually, of course, such a transmitter is required to be capable of transmitting to more than one mobile unit simultaneously. To achieve this, a base station transmitter is able to transmit many signals simultaneously at different frequencies. The total bandwidth allocated to the communications network is divided into discrete carrier frequencies (124 in GSM) at 200 KHz intervals. In order to generate these different frequencies, the base-station transmitter further comprises a number of so-called transmitter paths T1 etc. as shown in FIG. 2. Each of the transmission paths in FIG. 2 has the components of the transmitter 10 in FIG. 1. Each transmitter path is capable or generating signals at frequencies different to the other transmitter paths. Furthermore, each transmitter path can usually vary its transmission frequency such that it can generate signals at all of the discrete carrier frequencies if required.

As is known in the art, a TDMA system provides for a particular mobile unit to have access to a particular transmission frequency for a limited period of time (a time slot), so that a communication channel is established by reference to a particular times slot.

Figure 3:
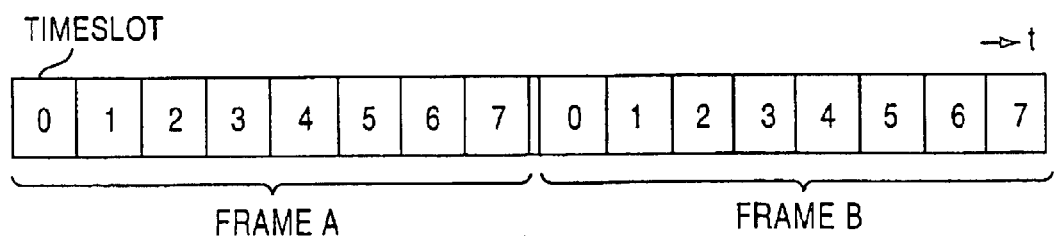
FIG. 3 illustrates part of a signal transmitted by one of the transmitter paths.

The signal transmitted by the transmitter path is of a form generally illustrated by FIG. 3. The signal consists of a sequence of frames (A, B, C. . . ). Each frame is sub-divided into 8 time periods called time-slots (0–7).

Each time slot (0–7) contains data for one mobile unit. Subsequent data for that mobile unit will, under typical circumstances, be sent in the same time slot in subsequent frames. Thus, time slot 0 in frame A may contain data for mobile G unit MB0. Time slot 0 in frame B will then also contain data for mobile unit MB0, as will time slot 0 in frames C, D, E . . . etc. This allocation of time slot 0 to mobile unit MB0 may continue until such time as the connection to mobile unit MB0 is terminated. The internal clocks of the base station and the mobile unit MB0 are synchronised such that the mobile unit MB0 always and only listens for data during time slot 0 of any frame. In other words, the communication channel between the base station and the mobile unit MB0 are only "open" during its allocated time slot. Similar considerations apply to communication channels with mobile units allocated to other time slots.

Figure 4:
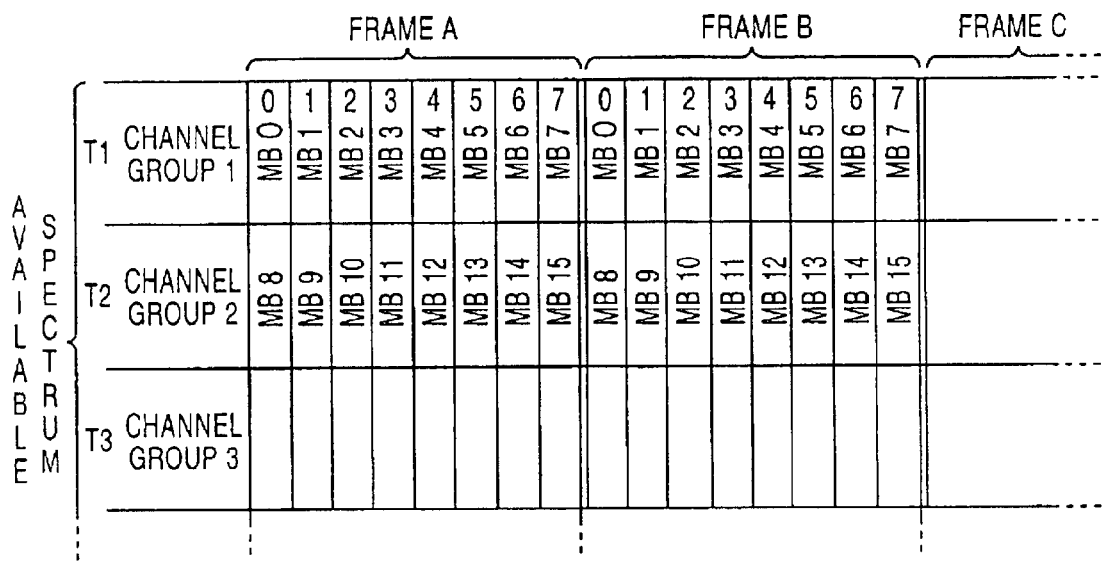
FIG. 4 illustrates the format of a signal transmitted by the transmitter as a whole.

FIG. 4 illustrates conceptually the structure of data transmitted by the base station transmitter. The transmitter path T1 has allocated to it the Channel group 1 comprising 8 mobile units MB0-MB7. It transmits a signal made up of a sequence of frames (A, B, C . . . ) each frame being divided into 8 time slots (0–7) containing data for one of the 8 mobile units. The transmitter path T2 has allocated to it the Channel Group 2 comprising a further 8 mobile units MB8-MB15. It transmits a signal (simultaneously but on a different frequency to that of the transmitter path T1) made up of a sequence of frames A, B, C . . . but with each time slot (0–7) containing data for one of its own mobile units MB8-MB15.

As described above, the base station transmitter may be made up of a large number of transmitter paths, some or all of which (depending on the volume of "traffic") may be transmitting signals simultaneously on different frequencies.

Figure 5:
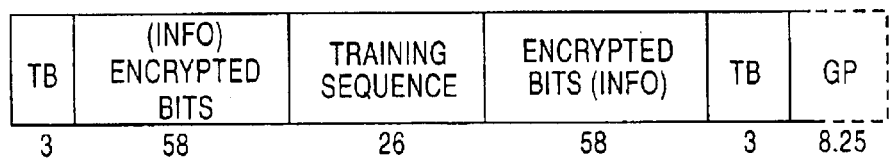
FIG. 5 illustrates the construction of a time slot.

The data contained in each time slot is usually made up of several parts as shown in FIG. 5. The data may comprise:
TAIL BITS (TB)—two groups of 3 bits for control/reset purposes,
ENCRYPTED BITS—two groups of 58 bits represented transmitted data,
TRAINING SEQUENCE—a fixed bit pattern of 26 bits used in generating a channel response,
GP denotes the guard space (of 8.25 bits, 30.46 µs in described example) to allow for time/distance propagation delays owing to cell size.

Figure 8:
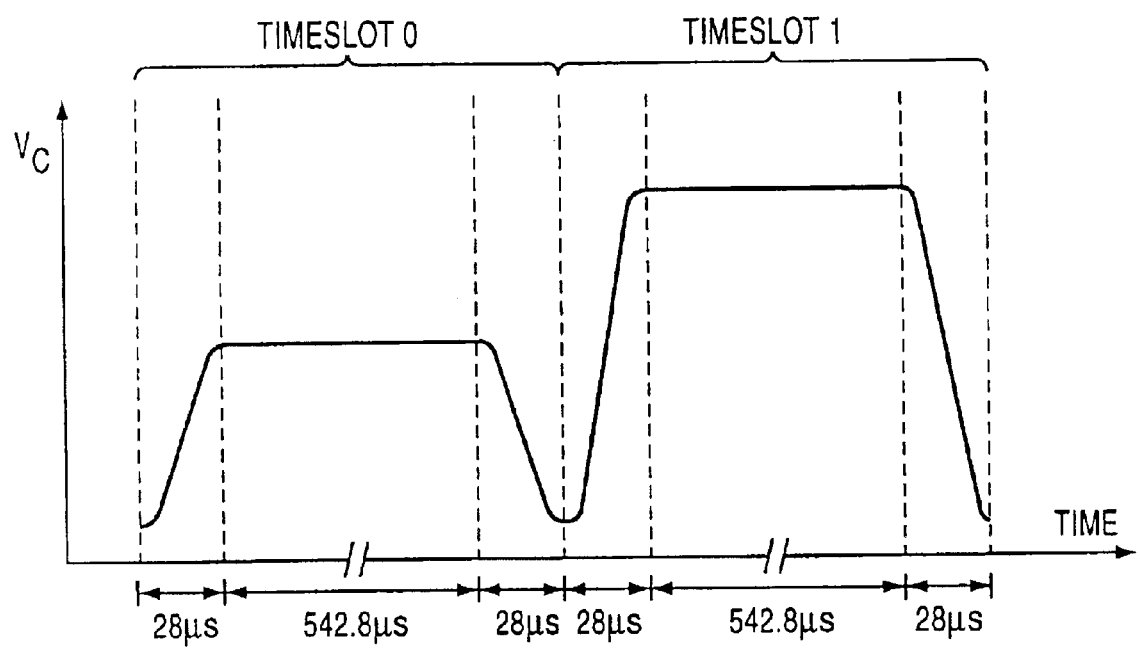
FIG. 8 is a timing diagram of a time slot in a transmission signal generated by a transmission path.

FIG. 8 shows a timing diagram of a signal transmitted by a single transmitter path. Each time slot has a time span of 577 µs in the described example. Within each time slot the transmitted signal is firstly "ramped up" to a specified level during the first 28 µs of the time slot. Then the data is transmitted at that level over the following 542.8 µs (147 bits). Finally, the signal is "ramped down" over the subsequent 28 µs. The following time slot is transmitted in a similar way.

Part of the GSM requirements are that the communications system must be capable of frequency -hopping. As the name implies, frequency-hopping is the ability to change the transmit frequency of any particular channel at regular intervals. Such frequency-hopping is primarily used to provide a level of security for transmitted signals and to prevent unauthorised parties from "eavesdropping" on mobile telephone transmissions.

Frequency hopping may occur between consecutive frames or consecutive time slots. In any event, a frequency change needs to be effected between time slot 7 of frame A and time slot 0 of Frame B.

Referring back to FIGS. 2 and 3, each transmitter path is capable of transmitting signals at different frequencies. In order to provide frequency-hopping, the transmitter path changes the frequency at which it transmits after each time slot. Thus, time slot 0 in frame A may be transmitted by transmitter path T1 at a frequency $f_0$. Time slot 1 of frame A may then be transmitted at a frequency $f_1$. Similarly, time slot 2 in frame A may be transmitted at a frequency $f_2$ and so on. Time slot 0 of frame B may subsequently be transmitted at a frequency $f_n$ where n is a number other than (in this case) O, i.e. the frequency at which time slot 0 is transmitted in any frame must be different from the frequency at which it was transmitted in the previous frame.

The manner in which the frequencies of each time slot vary is specified in GSM and is determined by an algorithm and controlled by a frequency controller. The varying of the frequencies at which data for a single mobile unit is transmitted ensures that it becomes very difficult for any unauthorised receiver to lock onto the correct signal in order to eavesdrop.

Figure 6:
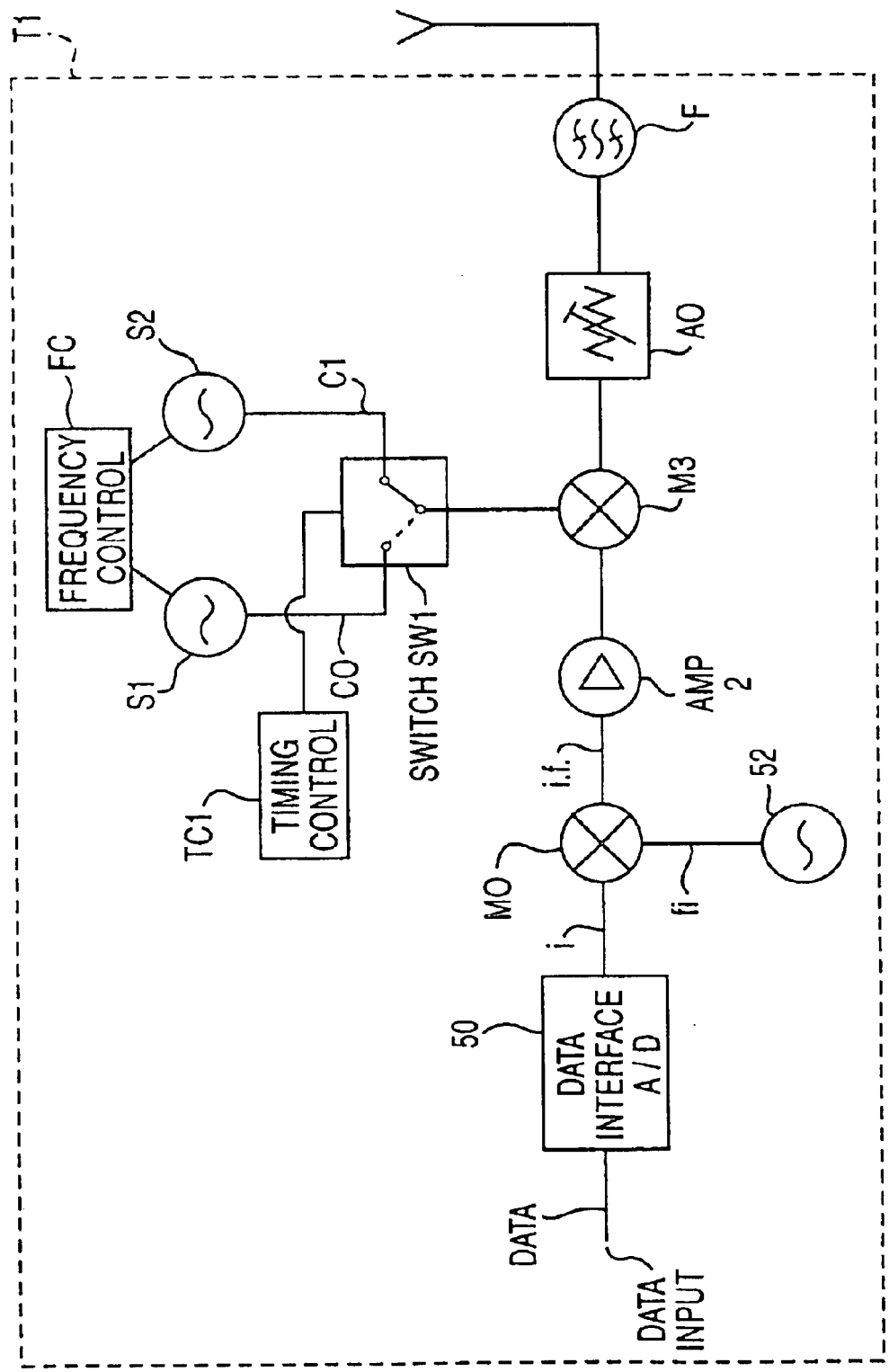
FIG. 6 is a block diagram illustrating a known frequency hopping control in a transmitter path.

FIG. 6 shows a system which provides frequency-hopping in a base station transmitter. As illustrated, the components within the box T1 represent the transmitter path T1 shown in FIG. 2.

Each transmitter path comprises a data input into which is fed a data signal DATA containing data to be transmitted (e.g. speech). The data signal, which may be in an analog form, is then sent through a data interface 50 which may be represented by an analog to digital convertor, which encodes the signal such that it is suitable for transmission. The data interface 50 outputs the signal as the information signal i.

As described with reference to FIG. 1, the information signal i is mixed with an intermediate frequency signal $f_i$ generated by an I.F generator 52 (up converted) to produce information signal i.f. and then amplified by an amplifier AMP 2.

In order to provide hopping between different transmission frequencies, each transmission path is provided with two local oscillators or synthesizers (S1, S2) which are variable in frequency, The two synthesizers S1 and S2 are operable to generate radio frequency carrier signals which are mixed with the information signal i by mixer M3 before transmission.

The outputs of the synthesizers are input to a switch SW1 which provides for the connection of either S1 or S2 (but not both simultaneously) to the mixer M3 in a so-called pingpong arrangement. An attenuator A0 is connected downstream of the mixer M3 and upstream of a filter F0.

In operation, when transmitter path T1 (for example) is transmitting time slot 0 in frame A, synthesizer S1 generates a carrier signal $C_0$ at a frequency $f_0$. Switch SW1, under the control of a timing control unit TC1, switches to allow S1 to be connected to mixer M3. In this manner, the information signal i.f. (containing data for a particular mobile unit) is mixed with the carrier signal $C_0$ to produce the transmission signal $TX_0$ associated with time slot 0 in frame A.

At the same time, the synthesizer S2 tunes itself to a different frequency $f_1$ to be used for transmitting time slot 1 in frame A. As described above, the frequency to which S2 tunes is determined by an algorithm in conjunction with the frequency control unit FC.

After transmitting the data in time slot 0, the timing control unit TC1 then switches to allow the synthesizer S2, generating a carrier signal $C_1$ at frequency $f_1$, to be connected to the mixer M3. The information signal i.f (now containing information to be transmitted to a different mobile unit) is mixed with the carrier signal $C_1$ to produce the transmission signal $TX_1$ associated with time slot 1.

Once again, during the period in which synthesizer S2 is connected to the mixer via switch SW, synthesizer S1 tunes itself to a different frequency $f_2$ to be used for transmitting time slot 2 in frame A, determined by an algorithm in conjunction with frequency control unit FC.

This process is repeated for subsequent time slots and subsequent frames.

A major problem with the architecture employed by systems such as those of FIG. 6 is that the switch SW1 must provide a very high degree of isolation between synthesizers S1 and S2. If, within the switch, the connections from S1 and S2 are not sufficiently isolated, then interference and phase distortion will occur between the two signals. This interference corrupts the transmission signal. In practice, isolation between the connections of S1 and S2 must be provided to a level of around 90 dB in order to prevent these problems.

Switches which provide this level of isolation are complex and expensive.

Figure 7:
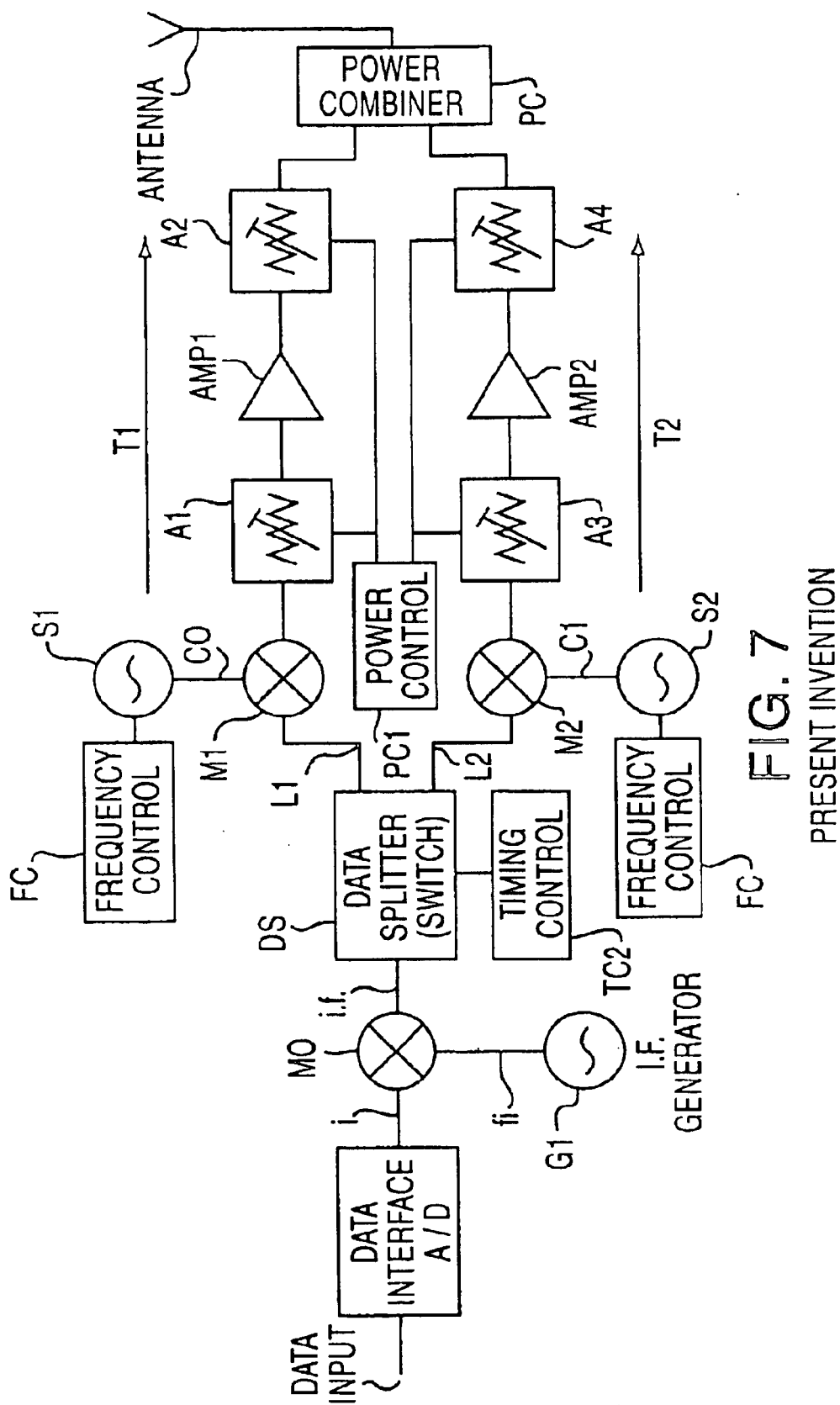
FIG. 7 is a block diagram showing the components of a transmitter path according to the present invention.

FIG. 7 shows an architecture for a transmitter path which aims to address this problem.

A data input is connected to a data interface. This interface may be an analog to digital convertor operable to perform a suitable encoding process and has an output to a mixer M0. The output of mixer M0 is connected to a data splitter or switch DS which itself is connected to a timing control unit TC2. The Data splitter DS has two outputs, the lines L1 and L2.

The line L1 is connected to a first mixer M1. The first mixer M1 is connected to the synthesizer S1 and is operable to mix the information signal on the line L1 with a carrier signal generated by the synthesizer S1.

The output of the first mixer M1 is connected to an attenuator A1, the output of which is connected to an amplifier AMP1. The output of the amplifier AMP1 is connected to a second attenuator A2, the output of which is connected to a power combiner PC.

The Line L2 is connected to a second mixer M2. The second mixer M2 is connected to the synthesizer S2 and is operable to mix the information signal on the line L2 with a carrier signal generated by the synthesizer S2.

The output of the mixer M2 is connected to an attenuator A3, the output of which is connected to an amplifier AMP2. The output of the amplifier AMP2 is connected to a second attenuator A4, the output of which is connected to the power combiner PC.

The output of the power combiner PC represents the transmission signal which is to be transmitted.

Synthesizers S1 and S2 are each connected to a frequency control unit FC. Although in FIG. 8 the frequency control units connected to the synthesizers S1 and S2 are shown as separate components, they may be provided as a single unit as in FIG. 7.

The attenuators A1-A4 are each connected to a power control unit PC1.

In operation, data to be transmitted is input to the data interface in a similar manner to the system described above. The data interface performs a suitable encoding process on the data and outputs the data as an information signal i. The information signal is fed to the mixer M0 which mixes it with an intermediate frequency signal $f_i$ generated by an intermediate frequency generator G1. The up converted information signal i.f is then fed to the data splitter DS which supplies the information signal to lines L1 and L2. It may be advantageous to switch the information signal such that it is output either on the line L1 or the line L2 under control of the timing control unit TC2.

If the transmitter path T1 (for example) is to transmit time slot 0 in frame A, the synthesizer S1 generates an RP carrier signal $C_0$ at a frequency $f_0$. The information signal is output on the line L1 to the first mixer M1. In this manner, the information signal is mixed with the carrier signal $C_0$ to produce the transmission signal $TX_0$ associated with time slot 0. The transmission signal $TX_0$ is passed through the attenuators A1 and A2 and the amplifier AMP1 to the power combiner PC. The power combiner PC outputs the transmission signal as the signal to be transmitted in time slot 0.

Simultaneously, the frequency control unit FC sends a signal to the synthesizer S2 to tune itself to generate an RF carrier signal $C_1$ at a different frequency $f_1$ to be used for transmitting time slot 1 in frame A. As in the conventional system, the frequency to which the synthesizer S2 tunes is determined by an algorithm in conjunction with the frequency control unit FC. Also at this time, the power control unit PC1 controls the attenuators A3 and A4 such that any signal being generated by synthesizer S2 are attenuated to a low level at the input to the power combiner PC compared to those signals generated by the synthesizer S1.

After transmitting the data in time slot 0, the transmitter path T2 can be used to transmit time slot 1. The data splitter outputs the information signal, containing information to be transmitted in time slot 1, on line L2 to the mixer M2. In this manner, the information signal is mixed with the carrier signal $C_1$ generated by the synthesizer S2 at a frequency $f_1$ to produce the transmission signal $TX_1$ associated with time slot 1.

During the period in which time slot 1 is being transmitted, the synthesizer frequency control FC sends a signal to the synthesizer S1 to tune itself to a different frequency $f_2$. As before, the frequency to which the synthesizer S1 tunes itself is determined by an algorithm. Also during this period, the power control unit PC1 controls the attenuators A1 and A2 such that any signals being generated by the synthesizer S1 are attenuated to a low level when they reach the power combiner PC compared to the signals which are generated by the synthesizer S2.

This process is repeated for subsequent time slots and subsequent frames.

It can be seen that in the above described embodiment an advantage resides in providing two separate branches within each transmitter path along which to transmit the information signal. With such an architecture, the carrier signals generated by the synthesizers S1 and S2 only come into close proximity with each other in the power combiner PC. At this point, however, at least one of the signals is attenuated to a low level compared with the other such that interference between the two signals in low. The power combiner, therefore, needs only to provide a low level of isolation within the power combiner which can be achieved easily and inexpensively.

The second transmitter path branch replaces the expensive switches which are normally needed to provide isolation. In addition to providing inherent isolation between the synthesizers, the architecture also provides simplified power control. Each branch of the transmitter path operates on alternate time slots. This allows for the full use of the guard periods for ramp up and ramp down used in the transmitter.

Furthermore, the second branch provides a higher level of redundancy, and hence reliability, for each transmitter path.

The architecture itself is suitable for integration to an Application Specific Integrated Circuit (ASIC). In this regard, it may be possible to incorporate this structure into the ASICs currently used in mobile units.

What is claimed is:

1. A transmitter for transmitting RF data in an RF communication network using a plurality of carrier frequencies, said RF data being represented by an information signal at a selectable carrier frequency, the transmitter comprising:

a data splitter arranged to receive said information signal modulated onto an intermediate frequency lower than the carrier frequency; and two transmitter paths each having an input connected to the data splitter and each having a frequency converter arranged to upconvert the intermediate frequency modulated signal to a respected carrier frequency, the carrier frequency being individually selectable for each transmitter path, the transmitter being configured such that for each of the two transmitter paths, when an information signal is being transmitted on that transmitter path, the carrier frequency for transmission on the other transmitter path is being selected, such that, in each case, the carrier frequency being selected for a channel is distinct from a previous carrier frequency at which that channel is transmitted.

2. A transmitter according to claim 1 wherein each transmitter path includes preset attenuation means located to attenuate the upconverted information signal prior to transmission.

3. A transmitter according to claim 1, wherein each transmitter path includes an amplifier located to amplify the upconverted, optionally attenuated, information signal prior to transmission.

4. A transmitter according to claim 1, wherein each transmitter path includes adjustable attenuation means for attenuating the upconverted information signal prior to transmission.

5. A transmitter according to claim 4, which comprises power control means for controlling the adjustable attenuation means.

6. A transmitter according to claim 1, which comprises a power combiner, each transmitter path having an output connected to the power combiner.

7. A transmitter according to claim 1, wherein each frequency modulator comprises a frequency generator and a signal mixer.

8. A transmitter for transmitting RF data in an RF communication network using a plurality of carrier frequencies, said RF data being represented by an information signal at a selectable carrier frequency, the transmitter comprising:

a data splitter arranged to receive said information signal modulated onto an intermediate frequency lower than the carrier frequency; and two transmitter paths each having an input connected to the data splitter and each having a frequency converter arranged to upconvert the intermediate frequency modulated signal to a respected carrier frequency, the carrier frequency being individually selectable for each transmitter path, the transmitter being configured such that for each of the two transmitter paths, when an information signal is being transmitted on that transmitter path, the carrier frequency for transmission on the other transmitter path is being selected, such that, in each case, the carrier frequency being selected for a channel is distinct from a previous carrier frequency at which that channel is transmitted;

wherein the RF data is transmitted as a sequence of time slots, the data splitter being controllable to supply the information signal of one time slot on one of the transmitter paths, and the information signal of a subsequent time slot on a subsequent transmitter path.

* * * * *